(12) United States Patent
Marshall

(10) Patent No.: US 6,707,656 B1
(45) Date of Patent: Mar. 16, 2004

(54) OVER-VOLTAGE PROTECTION AGAINST PERIODIC DISTURBANCES

(75) Inventor: Robert A. Marshall, Georgetown, TX (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 09/752,877

(22) Filed: Dec. 28, 2000

(51) Int. Cl.[7] .................................................. H02H 3/20
(52) U.S. Cl. ..................... 361/91.1; 361/91.6; 361/111; 361/119
(58) Field of Search .............................. 361/91.1, 91.6, 361/110, 111, 119

(56) References Cited

U.S. PATENT DOCUMENTS

| | | | |
|---|---|---|---|
| 3,609,413 A | * 9/1971 | Lane et al. .................. | 327/480 |
| 4,408,248 A | 10/1983 | Bulley et al. .................. | 361/91 |
| 4,849,846 A | 7/1989 | Hung et al. .................... | 361/56 |
| 5,287,288 A | * 2/1994 | Brennen et al. ............... | 702/58 |
| 5,883,775 A | 3/1999 | Maytum ....................... | 361/119 |

* cited by examiner

Primary Examiner—Brian Sircus
Assistant Examiner—James A Demakis
(74) Attorney, Agent, or Firm—Baker Botts L.L.P.

(57) ABSTRACT

An over-voltage protection module protects communications equipment against voltage surges, including periodic voltage disturbances. The protection module provides a steady state activation voltage threshold and a reduced activation voltage threshold less than the steady state value. Upon a receiving a periodic disturbance, the module activates initially upon receiving a voltage exceeding the steady state activation voltage threshold and activates for subsequent cycles of the disturbance upon receiving a voltage exceeding the reduced activation voltage threshold.

17 Claims, 3 Drawing Sheets

OVER-VOLTAGE PROTECTION AGAINST PERIODIC DISTURBANCES

TECHNICAL FIELD OF THE INVENTION

The present invention relates generally to over-voltage protection systems and more particularly to over-voltage protection against periodic disturbances.

BACKGROUND OF THE INVENTION

Communications systems contain vast lengths of wiring that may be subjected to various disturbances. Lightning strikes, power lines, and other interferences may impress high voltages and high currents through these lines. Some of these interferences impart energy sufficient to damage or destroy communications equipment connected to the lines. To protect communications equipment, lines may include current limiting devices, such as fuses, to protect against sustained high voltages and voltage limiting devices to protect against high voltage surges. For example, in the event of a lightning strike, a shorting device may short circuit between the wires of a twisted pair line to allow the energy of the surge to dissipate along the full length of both wires. For a periodic disturbance, such as an impressed alternating current, a shorting device may alternate between short circuiting the wires in either direction. While this may dissipate a significant portion of the energy from the disturbance, the cyclical response of the shorting device to the periodic disturbance can result in high frequency surge remnants that can damage communications equipment. Moreover, the cyclical response may cause the shorting device to heat, causing potential fire hazards and damaging protection circuitry.

SUMMARY OF THE INVENTION

In accordance with the present invention, techniques for over-voltage protection against periodic disturbances are provided which substantially eliminate or reduce disadvantages and problems associated with previous techniques. In a particular embodiment, the present invention satisfies a need for a device that protects against a periodic voltage disturbance without passing on damaging surge remnants.

According to one embodiment of the present invention, an over-voltage protection module includes a selectable crowbar device (SCD) that, when activated, permits current to flow from a first terminal to a second terminal. The protection module also includes a control module having a first state and a second state. In the first state, the control module activates the SCD and enters the second state if a voltage differential between the first terminal and the second terminal exceeds a first activation threshold. In the second state, the control module activates the SCD if the voltage differential exceeds a second activation voltage threshold that is less than the first activation voltage threshold.

In accordance with another embodiment of the present invention, a method for protecting from over-voltage provides a first state having a first activation voltage threshold and provides a second state having a second activation voltage threshold that is less than the first activation voltage threshold. The method receives a signal that produces a voltage differential between a first terminal and a second terminal. In the first state, the method enters the second state and activates a selectable crowbar device if the voltage differential exceeds the first activation voltage threshold. In the second state, the method activates the SCD if the voltage differential exceeds the second activation voltage threshold, wherein activating the SCD permits current to flow from the first terminal to the second terminal.

Various embodiments of the present invention provide numerous technical advantages. A device implementing these techniques provides protection against periodic disturbances without creating high frequency power fault harmonics. This reduces the possibility that cyclical disturbances will result in damage to communications equipment. Also, a reduced response time to subsequent cycles of a periodic disturbance reduces stress on an over-voltage protection module. The module subjects itself to less energy, and thus dissipates less heat than traditional protection circuitry when experiencing a periodic disturbance. This guards against damage to the protection module, increases expected life spans, and reduces fire hazards. Moreover, while the increased complexity of the device can increase material and production costs, these costs may be more than offset by the value of equipment protected from damage.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
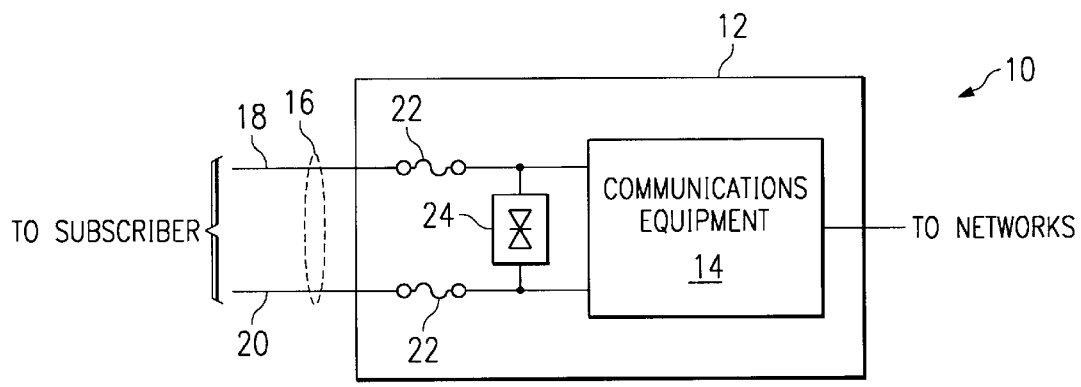
FIG. 1 illustrates a communications system having communications equipment protected by an over-voltage protection module according to the present invention.

FIG. 1 illustrates a communications system, indicated generally at 10, that includes a communications device 12 that provides communications services for subscribers. Device 12 includes communications equipment 14 that couples to a subscriber on twisted pair line 16, which includes a tip 18 and a ring 20. Within device 12, fuses 22 and an over-voltage protection module 24 protect communications equipment 14 from potentially damaging disturbances and interference. In general, module 24 provides protection against voltage surges and protects communications equipment 14 from periodic disturbances without subjecting equipment 14 to damaging surge remnants.

Twisted pair line 16, which includes tip 18 and ring 20, represents electrical transmission media forming a pathway for signals between communications equipment 14 and subscribers. Line 16 may extend through the ground, through overhead lines, into subscriber equipment, and through other systems. Thus, line 16 may be subjected to disturbances and interference, such as lightning strikes, that can damage communications equipment 14. These disturbances may also include periodic signals with relatively high voltages. For example, a broken power line in contact with ground close to line 16 may cause a high voltage, 60 Hz signal on line 16. Module 24 attempts to neutralize these damaging voltages by short circuiting between tip 18 and ring 20 to prevent communications equipment 14 from receiving any damaging signals. However, while the embodiment illustrated includes module 24 having two terminals, one coupled to tip 18 and one to ring 20, system 10 contemplates module 24 having more than two terminals and/or providing shortcircuit conduits between tip 18, ring 20, and other suitable terminals. For example, module 24 may couple between tip 18 and a ground terminal, between ring 20 and a ground terminal, or between tip 18, ring 20 and a ground terminal.

Communications equipment 14 represents hardware (including any appropriate software) that provides communications services for subscribers, for example, a digital subscriber line (XDSL) modem. Communications equipment 14 provides subscribers access to remote devices and other networks, such as the public switched telephone network (PSTN), a global computer network such as the Internet, local area networks (LANs), wide area networks (WANs), and/or other suitable communications networks.

Fuses 22 protect communications equipment 14 against sustained, high voltage signals on line 16. For example, a 600 volt open circuit disturbance or a 40 amp closed circuit disturbance may cause one or both of fuses 22 to activate, severing line 16 and separating communications equipment 14 from the potentially damaging disturbance. Fuses may include any suitable devices for temporarily or permanently severing line 16.

Module 24 represents hardware, software, and/or logic that protects against over-voltages. When a sufficiently high voltage differential exists between tip 18 and ring 20, module 24 short circuits to allow the voltage to pass along tip 18 and ring 20, which allows the length of line 16 to dissipate energy from the voltage as heat. Module 24 is bi-directional, in that module 24 may allow current to pass from tip 18 to ring 20 or may allow current to pass from ring 20 to tip 18. For example, given a voltage on tip 18 that exceeds some activation voltage threshold, module 24 short circuits to allow current to pass from tip 18 to ring 20. Similarly, given a voltage on ring 20 that exceeds the activation voltage threshold, module 24 shorts to allow current to pass from ring 20 to tip 18.

By providing a bi-directional short circuit device that activates upon receiving a voltage that exceeds some threshold, system 10 protects communications equipment 14 against a variety of potentially damaging disturbances. However, periodic disturbances with sufficient voltage can result in damaging surge remnants due to cycling of module 24 between allowing current to flow from tip 18 to ring 20 and allowing current to flow from ring 20 to tip 18. For example, to provide dielectric isolation for communications equipment 14, communications equipment 14 may include a split transformer to couple to line 16. Cyclical flipping of module 24, even at voltages kept below an activation voltage threshold, could generate power fault harmonics in the split transformer that would damage communications equipment 14. To protect against such cycling, module 24 may provide a first activation voltage threshold for the first surge of a periodic disturbance and a second, lower, activation voltage threshold for subsequent surges of the periodic disturbance.

For example, module 24 may operate as a state device with a steady state for normal operations and a triggered state that occurs after receiving a surge. In the steady state, module 24 short circuits upon receiving a voltage surge that exceeds an initial activation voltage threshold. Then, in the triggered state, module 24 short circuits when a voltage surge received exceeds a second, reduced activation voltage threshold. Thus, module 24 short circuits subsequent surges of a periodic disturbance at a lower voltage than the initial surge. This reduces the energy dissipated by module 24 and reduces the likelihood that module 24 will subject communications equipment 14 to harmful surge remnants.

While in the triggered state, module 24 may provide a timeout or other mechanism for returning to the steady state. According to a particular embodiment, if module 24 fails to receive a surge for some period of time, module 24 may return to the steady state. According to another embodiment, a reduced activation voltage threshold in the triggered state increases over time until it equals the initial activation voltage threshold. Thus, the triggered state may "decay" until module 24 returns to the steady state. However, system 10 contemplates module 24 using any appropriate states, techniques, and criteria for determining activation voltages and for responding to disturbances.

Figure 2:
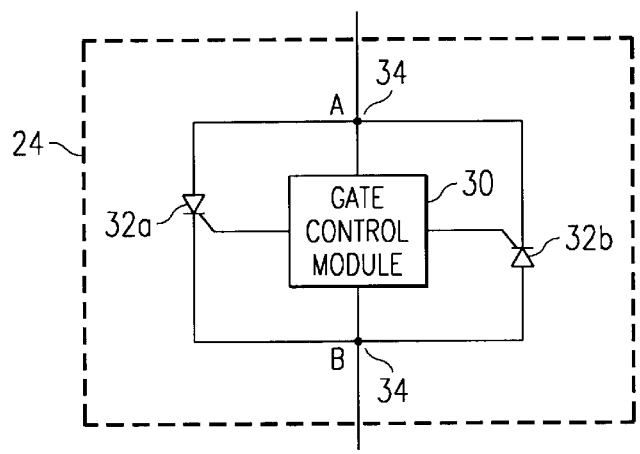
FIG. 2 is a block diagram illustrating an exemplary over-voltage protection module.

FIG. 2 is a block diagram illustrating functional components of an exemplary over-voltage protection module 24 that include a gate control module 30 and selectable crowbar devices 32a and 32b. Device 32a, device 32b, and gate control module 30 each connect to terminals 34 labeled A and B (terminal A and terminal B). Devices 32 each operate, when not activated, to prevent current from flowing from terminal A to terminal B and to prevent current from flowing from terminal B to terminal A. When activated, device 32a permits current to flow from terminal A to terminal B. Similarly, when activated, device 32b permits current to flow from terminal B to terminal A. In general, control module 30 monitors voltage differentials between terminal A and terminal B and activates device 32a or device 32b to prevent the voltage differential from harming communications equipment 14. In addition, control module 30 provides varying activation voltage thresholds such that subsequent surges of a periodic disturbance cause activation of device 32a or device 32b at a voltage less than the first surge of the disturbance.

Control module 30 represents circuitry, components, logic, and/or software for controlling devices 32 in response to voltage differentials between terminal A and terminal B. Devices 32 represent components, circuitry, and/or logic that, when connected between two terminals 34, prohibit current flow except when activated. When activated, devices 32 permit current flow in a single direction. According to a particular embodiment, protection module 24 implements devices 32 as silicon controlled rectifiers, that may contain multiple transistors and resistors.

In operation, control module 30 responds to voltage differentials between terminal A and terminal B to provide protection against voltage surges that exceed certain thresholds. During normal operations, control module 30 operates in a steady state. This represents times when a disturbance is not currently being received nor has a disturbance recently been received. While in this steady state, control module 30 does not activate device 32a or device 32b unless a voltage differential between terminal A and terminal B exceeds a steady state activation voltage threshold.

According to a particular embodiment, control module 30 uses a steady state voltage activation voltage threshold of 400 volts. For example, upon receiving a signal that generates a voltage differential of 400 volts between terminal A and terminal B, control module 30 activates device 32a to permit current to flow from terminal A to terminal B.

Similarly, upon receiving a signal that generates a voltage differential between terminal B and terminal A that exceeds 400 volts, control module 30 activates device 32b to permit current to flow from terminal B to terminal A. However, control module 30 may use any suitable steady state activation voltage threshold value set according to the requirements of communications equipment 14, industry standards, and/or other suitable criteria.

Upon receiving a surge sufficient to activate one of devices 32, control module 30 may enter a triggered state. In this triggered state, control module 30 activates one or both of devices 32 when a voltage differential between terminals 34 exceeds a reduced activation voltage threshold. For example, in the triggered state, control module 30 may activate device 32 upon receiving a voltage surge less than 100 volts. Thus, upon receiving a signal that generates a voltage differential between terminal A and terminal B that is greater than the reduced activation voltage threshold, control module 30 activates device 32a to permit current to flow from terminal A to terminal B. Similarly, while in the triggered state, upon receiving a signal that generates a voltage differential between terminal B and terminal A that is greater than the reduced activation voltage threshold, control module 30 activates device 32b to permit current to flow from terminal B to terminal A.

Control module 30 may use any suitable reduced activation voltage threshold determined based on specifications for communications equipment 14, industry standards, and/or other criteria. Also, the reduced activation voltage threshold may correspond to the types and specifications of components used to implement control module 30. For example, module 24 may include a capacitor that stores energy from surges, and a reduced activation voltage threshold may correspond to the energy remaining in the capacitor. Thus, a reduced activation voltage threshold for module 24 may correlate to any suitable criteria and components, and the reduced activation voltage threshold may change over time.

Moreover, while control module 30 in the preceding example enters a triggered state upon receiving a voltage surge from terminal A to terminal B or upon receiving a voltage surge from terminal B to terminal A, control module 30 may maintain states with relation to device 32a and device 32b. For example, upon receiving a voltage surge from terminal A to terminal B and activating device 32a, control module 30 may enter a triggered state with respect to device 32a. While in the triggered state with respect to device 32a, control module 30 activates device 32a upon receiving a voltage differential from terminal A to terminal B that exceeds a reduced activation voltage threshold. However, according to this embodiment, control module 30 maintains a separate triggered state with respect to device 32b. Thus, while triggered with respect to device 32a, control module 30 activates device 32b only upon receiving a voltage differential from terminal B to terminal A that exceeds a steady state activation voltage threshold. Therefore, as illustrated by this embodiment, a triggered state of control module 30 may result in a reduced activation voltage threshold for one or both of devices 32.

While in a triggered state, control module 30 uses a reduced activation voltage threshold before triggering short circuits using devices 32. However, control module 30 maintains a triggered state only for some period of time following a disturbance. Thus, after some period of time, control module 30 returns to steady state operation. According to a particular embodiment, the reduced activation voltage threshold increases over time while in the triggered state, so long as control module 30 does not receive additional surges. Thus, the reduced activation voltage threshold may increase over time, at a rate that occurs at a steady, exponential, geometric, or other pace. This increase occurs until the reduced activation voltage threshold equals the steady state activation voltage threshold, at which time control module 30 enters the steady state. According to another embodiment, a triggered state for control module 30 lasts for a predetermined and/or dynamically calculated period of time. For example, a triggered state for control module 30 may last for a set period of time, such as a period of time slightly greater than peaks of a 60 Hz signal. However, system 10 contemplates control module 30 using any suitable timeout and/or decay of a reduced activation voltage threshold to determine the length of a triggered state.

Figure 3:
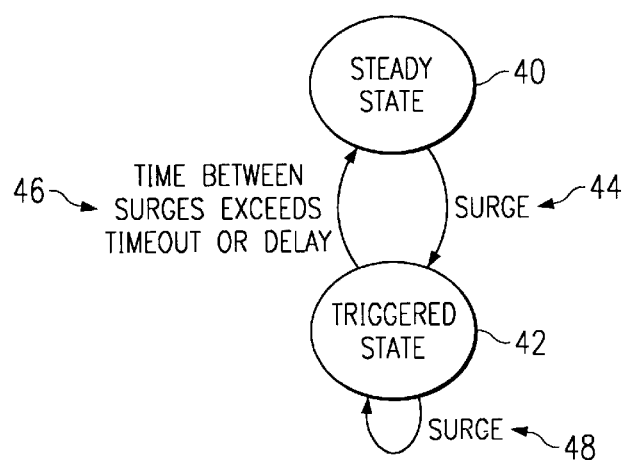
FIG. 3 is a state diagram illustrating the operation of an exemplary over-voltage protection module.

FIG. 3 is a state diagram illustrating the operation of control module 30 in response to a disturbance. This state diagram includes a steady state 40 and a triggered state 42. Control module 30 operates in steady state 40, as previously discussed, when a disturbance is currently not being received nor has a disturbance recently been received. However, upon receiving a voltage surge that exceeds a steady state activation voltage threshold, control module 30 enters triggered state 42.

In triggered state 42, control module 30 operates using a reduced activation voltage threshold that is less than the steady state activation voltage threshold. As previously discussed, triggered state 42 lasts only for some period of time after receiving a voltage surge in steady state 40. Thus, if the reduced activation voltage threshold increases until it equals the steady state activation voltage threshold, or if the time between surges exceeds some time out, control module 30 enters steady state 40, as indicated at 46. However, if an additional surge is received by control module 30 while in triggered state 42, control module 30 may reenter triggered state 42 as indicated at 48. When reentering triggered state 42, control module 30 may reset the reduced activation voltage threshold to its minimum value and/or reset any timers. Thus, so long as control module 30 continues to receive periodic surges, control module 30 remains in triggered state 42 and thus activates devices 32 at a reduced activation voltage threshold.

While this diagram illustrates specific states of control module 30, system 10 contemplates control module 30 using any appropriate number and type of states to determine varying activation voltage threshold for activating devices 32. For example, as previously discussed, control module 30 may maintain triggered states 42 with respect to each individual device 32.

Figure 4:
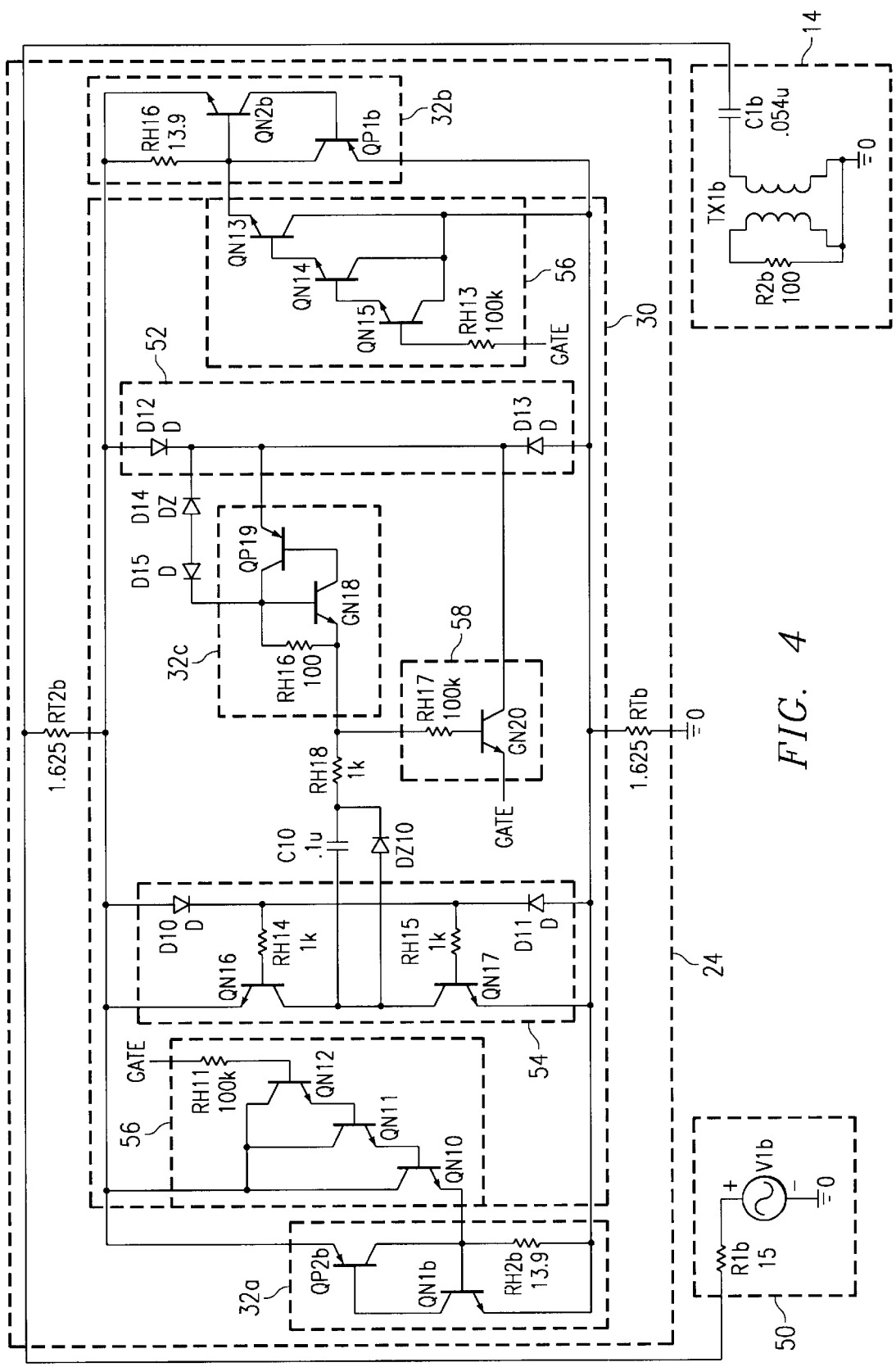
FIG. 4 is a circuit diagram illustrating an exemplary circuit implementing an over-voltage protection module.

FIG. 4 is a circuit diagram illustrating an exemplary circuit implementing various elements from system 10. Within this circuit diagram, various functional elements are separated by dashed boxes. This circuit includes exemplary components for protection module 24, communications equipment 14, and a modeled disturbance 50. Within protection module 24, dashed boxes separate components implementing device 32a, device 32b, and control module 30.

Devices 32 provide a high current shunt path that, when activated, permit current to flow between tip 18 and ring 20. Device 32a includes transistors QN1b and QP2b as well as a resistor RH2b. In the circuit diagram illustrated, RH2b models parasitic resistance resulting from real-world operation of transistors QN1b and QP2b. A voltage applied at the gate of transistor QN1b activates device 32a to permit current to flow from terminal A to terminal B. Device 32b includes transistors QP1b and QN2b as well as resistor RH1b. Similar to the operation of device 32a, a voltage at the gate of transistor QN2B activates device 32b to permit current to flow from terminal B to terminal A.

Control module 30 provides activation voltages for devices 32 based on received voltages. Control module 30 includes a bridge rectifier implemented as a positive half rectifier 52 and a negative half rectifier 54. Control module 30 also includes gate drivers 56. The bridge rectifier formed by positive half rectifier 52 and negative half rectifier 54 permits control module 30 to treat voltage differentials between terminal A and terminal B the same as voltage differentials between terminal B and terminal A. Gate drivers 56 each implement a Darlington configuration such that minimal current from a gate control signal will activate devices 32.

Control module 30 also includes a zener diode D14 that begins to conduct when voltage exceeds some threshold. According to this embodiment, the threshold for zener diode D14 represents the steady state activation voltage threshold. For example, zener diode D14 may begin to conduct when the voltage exceeds 400 volts. Control module 30 includes diode D15 to reduce reverse leakage current. Upon receiving a voltage greater than the breakdown voltage of zener diode D14, this voltage is applied to the gate of device 32c, which in turn activates to apply the voltage across the line to charge capacitor C10. In this exemplary circuit, diode DZ10 and resistor R18 clamp the voltage across capacitor C10 to 10 volts to permit the use of a low voltage capacitor. In combination, device 32c and capacitor C10 act as a memory, placing control module 30 in a triggered state upon receiving a voltage that exceeds the steady state activation voltage threshold. Each half cycle, capacitor C10 receives a small recharge of current. However, the charge remaining in capacitor C10 provides control module 30 a reduced activation voltage threshold upon receiving subsequent surges.

In addition to supplying a voltage to charge capacitor C10, upon receiving a voltage that exceeds the breakdown voltage of zener diode D14, a voltage is applied to a gate buffer 58 formed by resistor RH17 and transistor QN20. This in turn generates a gate control signal that, through gate drivers 56, provides activation signals for device 32a and device 32b. However, because current can only flow in one direction, only one of device 32a and device 32b will permit current flow upon receiving a gate control signal.

While this circuit diagram illustrates a specific embodiment for protection module 24, system 10 contemplates using any suitable circuitry, logic, components, and/or software to protect against periodic disturbances by providing a reduced activation voltage threshold after receiving an initial surge.

Figure 5:
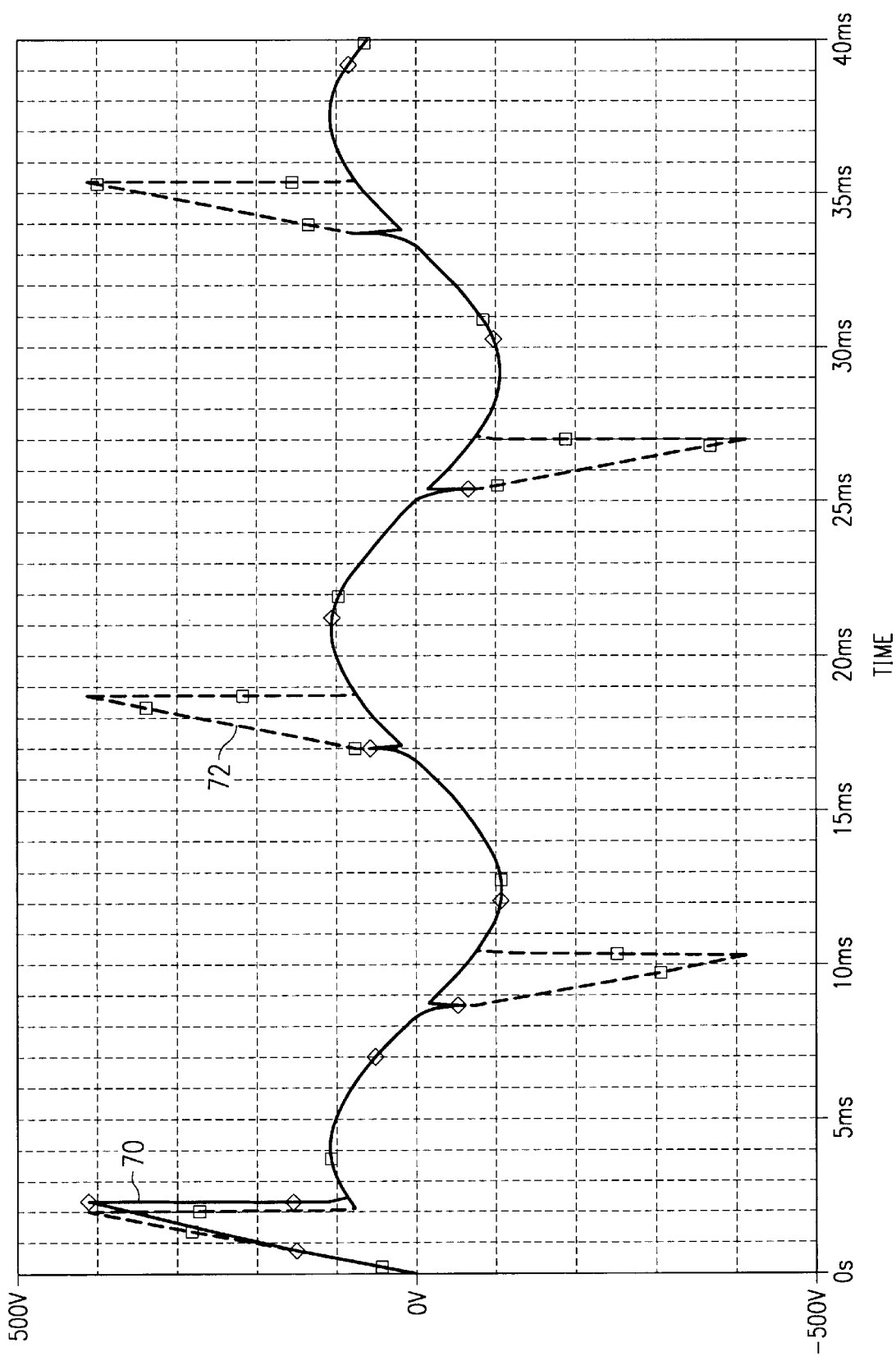
FIG. 5 is a graph illustrating operation of the over-voltage protection circuit compared to the operation of a typical surge protection circuit.

FIG. 5 is a graph illustrating the reaction of protection module 24 as implemented in the circuit diagram in comparison to the reaction of a typical over-voltage protection circuit. Trace 70 plots the reaction of protection module 24 in response to a 600V root mean square (RMS) sinusoidal disturbance, and trace 72 plots the response of a typical over-voltage protection circuit to the same 600V RMS sinusoidal disturbance. Both circuits use an initial 400V threshold before short circuiting to protect communications equipment 14. As evidenced by this plot, protection module 24 activates initially upon receiving voltage exceeding its steady state activation voltage threshold and, in subsequent cycles, activates upon receiving a reduced activation voltage threshold. In contrast, the typical over-voltage protection circuit, as demonstrated by trace 72, responds identically to each cycle of the disturbance. That is, trace 72 indicates that the typical circuitry activates upon receiving a positive or negative signal of greater than 400V.

Particular advantages of protection module 24 over typical over-voltage circuits are evidenced by the responses of the two circuits. The cycling of the typical protection circuit caused by the sinusoidal disturbance (as shown in the graph) can generate harmful surge remnants that may damage or destroy communications equipment 14. More specifically, the surge remnants of the typical protection circuit may have high-frequency components induced by the sharp spikes resulting in each half-cycle. These high-frequency components can pass through components, such as transformers, and cause damage to communications equipment 14. In addition, a typical protection circuit passes through a linear region each half-cycle as it activates, while module 24 remains activated, or activates at a much lower voltage, for subsequent cycles of a periodic disturbance. Thus, module 24 dissipates significantly less energy than a typical protection circuit. This reduces strain on module 24 and reduces potential fire hazards.

Although the present invention has been described in several embodiments, a myriad of changes and modifications may be suggested to one skilled in the art, and it is intended that the present invention encompass such changes and modifications as fall within the present appended claims.

What is claimed is:

1. An over-voltage protection module comprising:
    a selectable crowbar device (SCD) operable, when activated, to permit current to flow from a first terminal to a second terminal; and
    a control module having a first state and a second state, wherein:
        in the first state, the control module enters the second state and activates the SCD if a voltage differential between the first terminal and the second terminal exceeds a first activation voltage threshold; and
        in the second state, the control module activates the SCD if the voltage differential exceeds a second activation voltage threshold that is less than the first activation voltage threshold, wherein in the second state, the second activation voltage threshold increases over time while an absolute value of the voltage differential is less than the second activation voltage threshold.

2. The over-voltage protection module of claim 1, further comprising:
    a second SCD operable, when activated, to permit current to flow from the second terminal to the first terminal; and wherein:
        in the first state, the control module enters the second state and activates the second SCD if an inverse of the voltage differential exceeds the first activation voltage threshold; and
        in the second state, the control module activates the second SCD if the inverse of the voltage differential exceeds the second activation voltage threshold.

3. The over-voltage protection module of claim 1, wherein the SCD inhibits current flow from the second terminal to the first terminal and, when not activated, inhibits current flow from the first terminal to the second terminal.

4. The over-voltage protection module of claim 1, wherein the SCD comprises a silicon controlled rectifier.

5. The over-voltage protection module of claim 1, wherein:
    the control module includes a capacitor; and a difference between the first activation voltage threshold and the second activation voltage threshold is proportional to a charge of the capacitor.

6. The over-voltage protection module of claim 1, wherein the control module enters the first state when the second activation voltage threshold equals the first activation voltage threshold.

7. A method for protecting from over-voltage comprising:

receiving a signal that produces a voltage differential between a first terminal and a second terminal;

in a first state, entering a second state and activating a selectable crowbar device (SCD) if the voltage differential exceeds a first activation voltage threshold; and in the second state, activating the SCD if the voltage differential exceeds a second activation voltage threshold that is less than the first activation voltage threshold, wherein activating the SCD permits current to flow from the first terminal to the second terminal, and wherein in the second state, the second activation voltage threshold increases over time while an absolute value of the voltage differential is less than the second activation voltage threshold.

8. The method of claim 7, further comprising:

in the first state, entering the second state and activating a second SCD if an inverse of the voltage differential exceeds the first activation voltage threshold; and in the second state, activating the second SCD if the inverse of the voltage differential exceeds the second activation voltage threshold, wherein activating the second SCD permits current to flow from the second terminal to the first terminal.

9. The method of claim 7, wherein the SCD inhibits current flow from the second terminal to the first terminal and, when not activated, inhibits current flow from the first terminal to the second terminal.

10. The method of claim 7, wherein the SCD comprises a silicon controlled rectifier.

11. The method of claim 7, further comprising providing a capacitor for storing a charge, wherein a difference between the first activation voltage threshold and the second activation voltage threshold is proportional to a charge of the capacitor.

12. The method of claim 7, further comprising entering the first state when the second activation voltage threshold equals the first activation voltage threshold.

13. An over-voltage protection circuit comprising:

a first silicon controlled rectifier coupled to a first terminal, a second terminal, and a gate control line, the first silicon controlled rectifier operable, upon receiving a voltage on the gate control line, to permit current to flow from the first terminal to the second terminal, wherein the first silicon controlled rectifier comprises two back-to-back transistors;

a second silicon controlled rectifier coupled to the first terminal, the second terminal, and the gate control line, the second silicon controlled rectifier operable, upon receiving a voltage on the gate control line, to permit current to flow from the second terminal to the first terminal, wherein the second silicon controlled rectifier comprises two back-to-back transistors; and a control block including:

a wave rectifier that rectifies a voltage differential between the first terminal and the second terminal;

a capacitor; and a zener diode that receives the rectified voltage differential, wherein, when the rectified voltage differential exceeds a breakdown voltage of the zener diode, voltage is applied to the capacitor and on the gate control line.

14. The protection circuit of claim 13, wherein:

the breakdown voltage of the zener diode corresponds to a first activation voltage threshold for the protection circuit; and a second activation voltage threshold is proportional to a charge of the capacitor.

15. An over-voltage protection module comprising:

means for receiving a signal that produces a voltage differential between a first terminal and a second terminal;

means for, in a first state, entering a second state and activating a selectable crowbar device (SCD) if the voltage differential exceeds a first activation voltage threshold; and means for, in the second state, activating the SCD if the voltage differential exceeds a second activation voltage threshold that is less than the first activation voltage threshold, wherein activating the SCD permits current to flow from the first terminal to the second terminal; and wherein in the second state, the second activation voltage threshold increases over time while an absolute value of the voltage differential is less than the second activation voltage threshold.

16. The over-voltage protection module of claim 15, further comprising:

means for, in the first state, entering the second state and activating a second SCD if an inverse of the voltage differential exceeds the first activation voltage threshold; and means for, in the second state, activating the second SCD if the inverse of the voltage differential exceeds the second activation voltage threshold, wherein activating the second SCD permits current to flow from the second terminal to the first terminal.

17. The over-voltage protection module of claim 15, wherein the SCD comprises a silicon controlled rectifier.

* * * * *

UNITED STATES PATENT AND TRADEMARK OFFICE
CERTIFICATE OF CORRECTION

PATENT NO. : 6,707,656 B1
DATED : March 16, 2004
INVENTOR(S) : Marshall

It is certified that error appears in the above-identified patent and that said Letters Patent is hereby corrected as shown below:

<u>Title page,</u>
Item [57], ABSTRACT,
Line 6, after "Upon" delete "a".

Signed and Sealed this

Twenty-fourth Day of August, 2004

JON W. DUDAS
*Director of the United States Patent and Trademark Office*